United States Patent
Bronzini

[15] 3,645,408
[45] Feb. 29, 1972

[54] ARTICLE TRANSFER MECHANISM
[72] Inventor: Bruno Bronzini, Turin, Italy
[73] Assignee: Fratelli Morando & C.S.p.A., Turin, Italy
[22] Filed: June 26, 1970
[21] Appl. No.: 50,154

[30] Foreign Application Priority Data
Feb. 25, 1970 Italy ................................67616 A/70

[52] U.S. Cl. .........................................214/1 BB, 214/1 BD
[51] Int. Cl. .............................................................B66c 1/42
[58] Field of Search ..............................214/1 BB, 1 B, 1 BD

[56] References Cited
UNITED STATES PATENTS
2,929,499  3/1960  Turner............................214/1 BD X
3,260,376  7/1966  Stoll...................................214/1 BB Primary Examiner—Gerald M. Forlenza
Assistant Examiner—George F. Abraham
Attorney—Young & Thompson

[57] ABSTRACT

Article transfer mechanism grips and releases articles, swings them about a horizontal axis, and translates them parallel to that axis. A pair of cam-operated jaws is actuated by a reciprocable rod which in turn is swung bodily about an axis parallel to the rod and translated along that axis. Three separate fluid motors actuate the gripping, swinging and translating devices.

2 Claims, 1 Drawing Figure

PATENTED FEB 29 1972  3,645,408
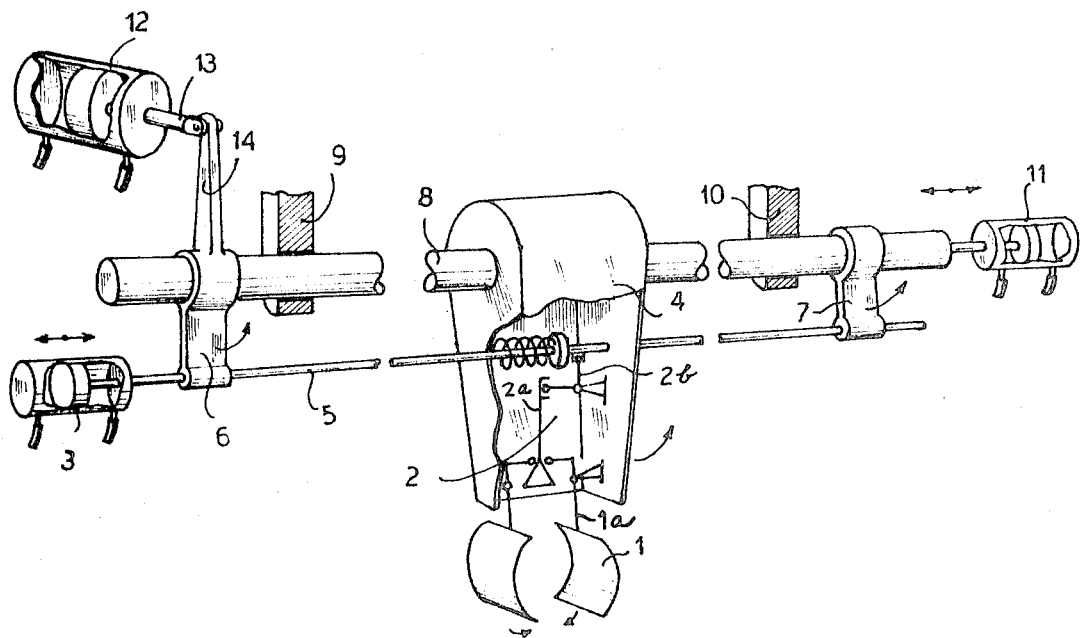
INVENTOR
BRUNO BRONZINI
BY Young & Thompson
ATTYS.

ARTICLE TRANSFER MECHANISM

The present invention relates to article transfer mechanism, more particularly of the type for moving articles into or out of or between work stations such as work stations of machines tools. It is an object of the present invention to provide article transfer mechanism which will selectively grip and release articles, swing them vertically, and translate them horizontally.

Another object of the present invention is the provision of article transfer mechanism whose movements will be selectively individually actuated.

Finally, it is an object of the present invention to provide article transfer mechanism which will be relatively simple and inexpensive to produce, easy to install, operate, maintain and repair, and rugged and durable in use.

Briefly, these objects are achieved by providing article transfer mechanism in which a pair of jaws are cam actuated to grip and release articles by sliding movement of a horizontal rod, the rod being mounted for bodily swinging movement about a parallel horizontal axis and bodily translatable along that axis, the latter axis being defined by a shaft on which the rod is slidably and swingably mounted. Separate fluid motors reciprocate the rod and shaft and swing the rod about the shaft.

Other objects, features and advantages of the present invention will become apparent from a consideration of the following description, taken in connection with the accompanying drawing, which is a somewhat schematic view of apparatus according to the present invention.

Referring now to the drawing in greater detail, there is shown article transfer mechanism comprising a pair of jaws 1 that are adapted to grasp and release a workpiece (not shown). Jaws 1 are mounted on levers 1a that are pivotally mounted on the inner sidewalls of a casing 4. Levers 1a are swung toward and away from each other by linkage 2 including a member 2a having oppositely inclined cam surfaces at its lower end that engage the upper ends of levers 1a to move them apart to grasp an article or to permit them to move together under the action of spring means (not shown) to release an article.

Member 2a, in turn, is moved vertically by the swinging movement of one arm of a crank 2b that is pivotally mounted on the inside of casing 4, another arm of crank 2b being reciprocated horizontally by means of a rod 5 that extends through casing 4 and is pivotally interconnected with this upper arm of crank 2b. In this way, reciprocatory horizontal movement of rod 5 opens and closes the jaws 1.

Means are provided to reciprocate rod 5 horizontally, in the form of a fluid motor 3 connected to a conventional source of fluid under pressure (not shown), the fluid motor 3 being of the cylinder an piston type and the rod 5 being for example the piston rod of this motor. Rod 5 is mounted for horizontal sliding movement in a pair of brackets 6 and 7.

The brackets 6 and 7, in turn, are fixed to a shaft 8 which in turn is mounted for rotation and horizontal sliding movement in a pair of fixed supports 9 and 10. Rod 5 is parallel to shaft 8 and remains so at all times. Casing 4 is fixed to shaft 8 for reciprocation and swinging movement therewith.

Means are provided for reciprocating shaft 8 in its supports 9 and 10, in the form of a fluid motor 11 which may for example be the same as motor 3. Means are provided for swinging the brackets 6 and 7 about the axis of shaft 8, in the form of a fluid motor 12 of the cylinder and piston type, whose piston rod 13 is pivotally interconnected with a crank arm 14 on bracket 6. Thus, bracket 6 turns shaft 8 which turns bracket 7; and brackets 6 and 7 turn rod 5.

The operation of the device according to the present invention will now be clear: when motor 3 is actuated in one direction or the other, the jaws 1 open or close. When motor 12 is actuated in one direction or the other, shaft 8 rotates and rod 5 and casing 4 swing vertically thereby to swing the jaws 1 vertically about the axis of shaft 8. When motor 11 is actuated, shaft 8 reciprocates, and with it the casing 4 and the rest of the structure described excepting only the mountings 9 and 10. In this connection, it will be understood that the representation of the structure horizontally reciprocable under the influence of motor 11 is only very schematic, as of course reaction supports for the motors 3 and 12 will be provided which are not shown and which reciprocate with shaft 8, the reaction support for motor 3 also swinging with brackets 6 and 7.

From a consideration of the foregoing disclosure, therefore, it will be evident that all of the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

Having described my invention, I claim:

1. Article transfer mechanism comprising a shaft, a pair of spaced brackets fixed to said shaft at spaced locations along said shaft, said brackets extending outwardly from said shaft, a rod carried by said brackets parallel to said shaft for sliding movement in said brackets relative to said shaft, means to reciprocate said rod in said brackets, means to rotate and reciprocate said shaft, a housing fixed to said shaft between said brackets and extending outwardly from said shaft, a pair of jaws carried by said housing, said rod passing through said housing and extending from opposite sides of said housing, and means interconnecting said rod and said jaws within said housing to open and close said jaws by swinging movement of said jaws about parallel axes which are substantially equidistant from said shaft.

2. Article transfer mechanism as claimed in claim 1, said means to rotate said shaft comprising an arm on one of said brackets extending in a direction opposite from said rod, and a fluid motor engageable with the end of said arm for swinging said arm to rotate said shaft.

* * * * *